March 14, 1967 N. A. THOMAS, JR 3,308,772
DISPOSABLE PALLET
Filed Jan. 3, 1966

INVENTOR.
NEIL A. THOMAS JR.
BY Louis Necho
ATTORNEY.

United States Patent Office 3,308,772
Patented Mar. 14, 1967

3,308,772
DISPOSABLE PALLET
Neil A. Thomas, Jr., Havertown, Pa., assignor to Crescent Box Corporation, Philadelphia, Pa., a corporation of Pennsylvania
Filed Jan. 3, 1966, Ser. No. 518,309
2 Claims. (Cl. 108—56)

This invention relates to a pallet adapted to support a stack of packages or other material, and to be carried by a fork lift truck or other means to transport the material from one location to another.

One object of this invention is to produce an improved pallet of the type set forth.

As far as I am aware, pallets heretofore used, are made of wood or other relatively durable and hence expensive materials and, for this reason, they had to be used over and over again. This means that a pallet must be "unloaded" every time it is used. In other words, if a number of packages are stacked on a conventional pallet for transportation from, let us say a truck to a storage warehouse, or from one place to another within the warehouse, it is necessary to unload the packages from the pallet after each move. In other words, if the material is not unloaded, the pallet will be out of use until the material is used up or shipped out. Since large numbers of expensive pallets are needed in any average establishment, a large sum of money is tied up.

It is therefore another object of the invention to produce a disposable pallet which is sufficiently strong and rigid to sustain ordinary loads, but which is constructed of an inexpensive, light-weight material, such as corrugated carboard or plastic.

A still further object is to make a disposable pallet which has a minimum number of parts and which can be produced by mass methods.

The full nature of this invention will be understood from the following specifications and the accompanying drawings in which.

Figure 1:
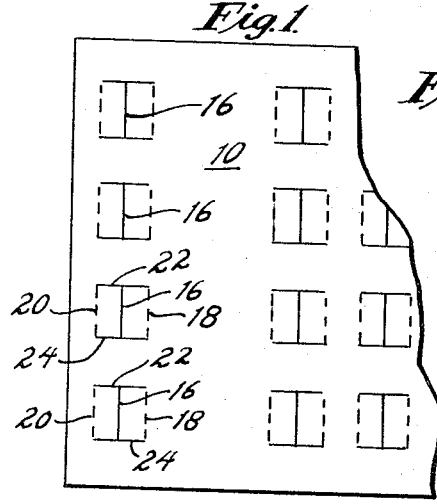
FIG. 1 is a fragmentary top view of the blank from which the body of a pallet embodying the invention is formed.
Figure 2:
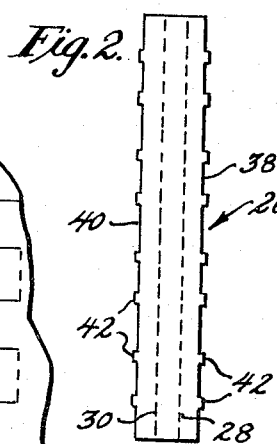
FIG. 2 is a top view of the blank from which the insert shown in FIG. 7 is formed.
Figure 3:
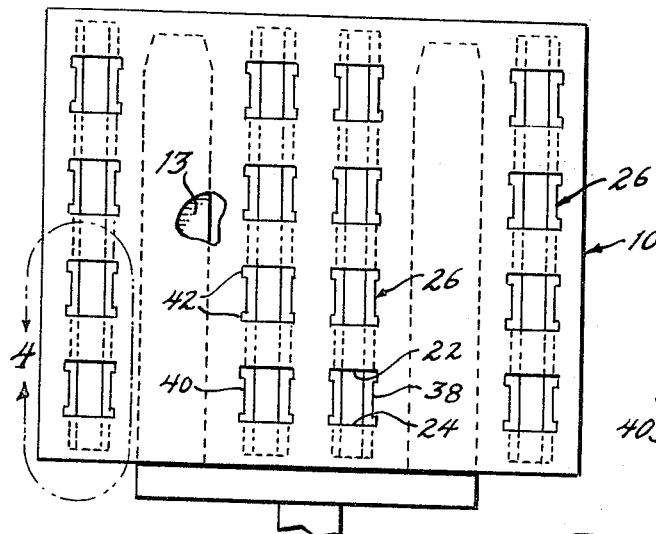
FIG. 3 is a top view of a completed pallet constructed according to the invention with the forks of a lift-truck shown in broken lines there-beneath.
Figure 5:
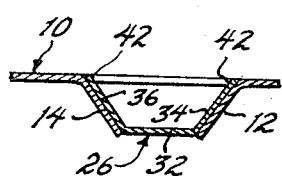
FIG. 5 is a sectional view, looking in the direction of line 5—5 on FIG. 4.
Figure 6:
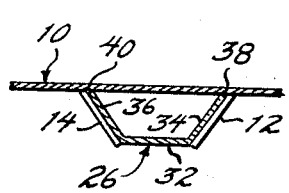
FIG. 6 is a sectional view looking in the direction of line 6—6 on FIG. 4.

The pallet of my invention is formed of a blank, or sheet 10 which provides a load-receiving platform, and a number of supporting pairs of legs and a reinforcing member for each pair of legs. Each pair of legs is formed by die cutting slits 16, 22 and 24 in platform 10, and by scoring the platform along lines 18 and 20, to form hinged flaps 12 and 14, FIG. 1, which are adapted to be pushed downwardly as shown in FIGS. 5 and 6 to support the platform above the ground to allow the forks 13 of a lift truck to be inserted under said platform, FIG. 4. Each pair of legs is provided with a reinforcing member 26 which prevents the legs from collapsing, and helps support the weight. The reinforcing member is formed of the die cut sheet shown in FIG. 2 which is scored and bent along lines 28 and 30 to provide a bottom wall 32 and upwardly diverging side walls 34 and 36 as shown in FIG. 3. Edges 38 and 40, of side walls 34 and 36, respectively, are provided with a plurality of spaced tabs 42, which extend from said edges a distance approximately equal to the width of sheet 10, the purpose of which will be subsequently explained.

Figure 8:
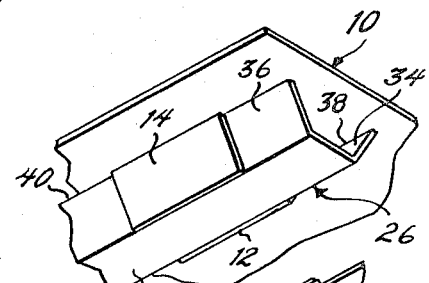
FIG. 8 is a fragmentary bottom perspective view, showing how the insert of FIG. 7 is assembled to the underside of pallet.
Figure 7:
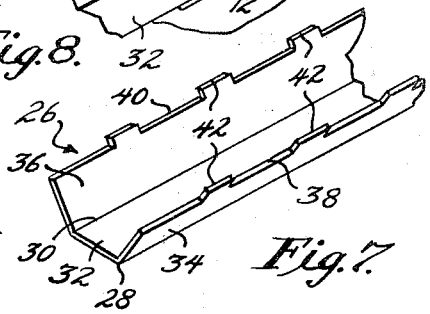
FIG. 7 is a perspective view of the blank shown in FIG. 2 after it has been formed.

The pallet is assembled by inserting one end of the reinforcing member between a pair of legs at one end of the platform as shown in FIG. 8, and moving it until it engages all of the pairs of legs across the length of the platform. As shown in FIGS. 6 and 7, side walls 34 and 36 are substantially equal to the height of, and are contiguous with, legs 12 and 14, respectively. By this arrangement the legs are forced apart and held in their spaced position by bottom wall 32. It will be noted that the portions of edges 38 and 40, of side walls 34 and 36, which extend between successive tabs 42, abut the underside of platform 10. By this arrangement, when a load is placed on the pallet, its weight is supported by legs 12 and 14 and by side walls 34 and 36.

Figure 4:
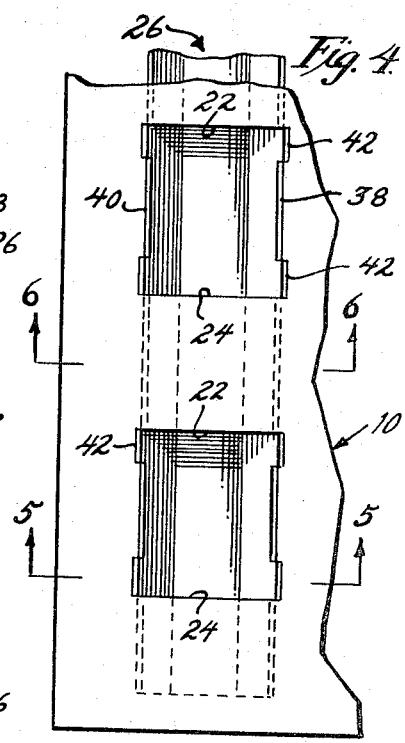
FIG. 4 is an enlarged view of the bracketed portion of FIG. 3.

As can best be seen from FIG. 4, tabs 42 extend through the openings in the platform which are produced by the formation of legs 12 and 14 and are spaced so as to abut the edges which are produced when the blank 10 is slit at 22 and 24.

As will be seen from the drawings, the pallet is provided with a large number of supporting legs so as to minimize the load for an individual pair of legs. In practice, the cardboard to be used is given a waterproof-coating, either by a dipping or spraying process, to make the pallet moistureproof. Pallets constructed according to this invention have been tested under actual working conditions and were found capable of supporting loads which are comparable to the loads to which conventional pallets are ordinarily subjected.

It will be understood that the structure above described is a preferred embodiment of the invention, and changes in the size and number of legs and in the arrangement of the spacing of the legs may be made without departing from the underlying idea or principles of this invention.

From the foregoing, it will be seen that by this invention, a disposable pallet is produced and that the pallet consists of only two parts which can be readily mass-produced, by stamping or die cutting flat sheets of inexpensive material such as cardboard or plastic, with very little waste. It will also be seen that the pallet can be assembled quickly and easily and without the use of any fastening means.

It will be seen that by inclining legs 12 and 14 and side walls 34 and 36, relative to the platform, a load placed on the pallet will force the side walls outwardly against the legs and the legs will be forced inwardly against the side walls and will be held in their spaced position by bottom wall 32, FIG. 6. These opposing forces between the side walls and the legs act to lock each reinforcing member securely in place.

In the embodiment illustrated, the rows of legs are so spaced as to allow the forks of a lift truck to be inserted from one of two sides but it will be understood that the spacing of the legs may be such as to allow insertion of the forks from any side.

It will be further seen that the parts can be shipped and stored in flat, knock-down, condition thereby reducing the storage space which would otherwise be needed.

Since the pallets are usually square, or rectangular, and since the reinforcing member is coextensive with one side of the body portion, it follows that the pallet can be produced by a single die cutting and slitting operation to form the parts, which can then be assembled by the use of a simple jig.

What I claim is:

1. A pallet including a platform having spaced, parallel rows of spaced openings formed therein, each having opposite side and end edges, integral, downwardly converging flaps hingedly connected to said side edges to form legs for supporting said platform, a reinforcing member for each of said rows of spaced openings, said reinforcing member comprising an elongated bottom wall and integral upwardly diverging side walls hinged to the opposite longitudinal edges of said bottom wall, the width of said flaps being substantially equal to the width of said side walls whereby, when said reinforcing member is inserted between said legs, said side walls will abut said flaps, the upper edges of said side walls will abut the underside of said platform, and the bottom edges of said flaps will abut the longitudinal edges of said bottom wall.

2. The pallet defined in claim 1 and spaced tabs projecting from the edges of said side walls and engageable with the opposite end edges of said openings to prevent longitudinal movement of said reinforcing member relative to said platform.

References Cited by the Examiner

UNITED STATES PATENTS

| | | | |
|---|---|---|---|
| 2,692,747 | 10/1956 | Strauss | 108—56 |
| 2,908,464 | 10/1959 | Traudt et al. | 108—56 |
| 2,925,978 | 2/1960 | Marso | 108—56 |
| 2,957,668 | 10/1960 | Norquist et al. | 108—56 |
| 3,036,802 | 5/1962 | Kitchell | 108—56 |
| 3,079,877 | 3/1963 | Doane | 108—56 |
| 3,131,656 | 5/1964 | Houle | 108—56 |
| 3,216,376 | 11/1965 | Anderson et al. | 108—56 |

FRANK B. SHERRY, *Primary Examiner.*

G. O. FINCH, *Assistant Examiner.*